United States Patent
Jeong et al.

(10) Patent No.: US 10,027,195 B2
(45) Date of Patent: Jul. 17, 2018

(54) MOTOR HAVING COOLING STRUCTURE

(71) Applicant: Hyundai Motor Company, Seoul (KR)

(72) Inventors: MyungKyu Jeong, Seoul (KR); Young Jin Seo, Gyeonggi-do (KR); Dongyeon Han, Seoul (KR)

(73) Assignee: Hyundai Motor Company, Seoul (KR)

( * ) Notice: Subject to any disclaimer, the term of this patent is extended or adjusted under 35 U.S.C. 154(b) by 274 days.

(21) Appl. No.: 14/945,745

(22) Filed: Nov. 19, 2015

(65) Prior Publication Data

US 2016/0344247 A1 Nov. 24, 2016

(30) Foreign Application Priority Data

May 20, 2015 (KR) ........................ 10-2015-0070644

(51) Int. Cl.
*H02K 1/32* (2006.01)
*H02K 9/02* (2006.01)
*H02K 9/19* (2006.01)

(52) U.S. Cl.
CPC ................ *H02K 1/32* (2013.01); *H02K 9/19* (2013.01)

(58) Field of Classification Search
CPC ............. H02K 9/19; H02K 1/32; H02K 9/02
USPC .......................................................... 310/54
See application file for complete search history.

(56) References Cited

U.S. PATENT DOCUMENTS

| | | | | |
|---|---|---|---|---|
| 1,531,724 A | * | 3/1925 | Arutunoff | H02K 9/19 277/512 |
| 2,947,892 A | * | 8/1960 | Inculet | H02K 9/08 310/57 |
| 3,184,624 A | * | 5/1965 | Solomon | H02K 9/19 310/54 |
| 3,435,263 A | * | 3/1969 | Willyoung | H02K 3/24 310/61 |
| 2004/0124722 A1 | * | 7/2004 | Uchida | B60K 6/26 310/54 |
| 2005/0206251 A1 | * | 9/2005 | Foster | B60K 6/26 310/59 |
| 2010/0141062 A1 | * | 6/2010 | Chamberlin | H02K 1/32 310/54 |
| 2010/0194220 A1 | * | 8/2010 | Tatematsu | H02K 1/2766 310/61 |
| 2011/0169353 A1 | * | 7/2011 | Endo | H02K 1/32 310/59 |
| 2012/0181848 A1 | * | 7/2012 | Makino | B60K 7/0007 301/6.5 |

(Continued)

FOREIGN PATENT DOCUMENTS

| | | |
|---|---|---|
| JP | 2008-125235 | 5/2008 |
| JP | 2010-172077 | 8/2010 |

(Continued)

*Primary Examiner* — Alex W Mok
(74) *Attorney, Agent, or Firm* — Mintz Levin Cohn Ferris Glovsky and Popeo, P.C.

(57) ABSTRACT

A motor having a cooling structure includes: a motor shaft in which a cooling passage is formed in a center thereof in a lengthwise direction; a rotor disposed at an exterior circumference of the motor shaft to rotate together with the motor shaft; and a motor housing in which a stator fixed at a predetermined interval from the rotor is disposed at an interior circumference thereof and in which the motor shaft is disposed to be rotatable, wherein a coolant flowing through the cooling passage is jetted to the rotor or the stator.

13 Claims, 4 Drawing Sheets

(56) References Cited

U.S. PATENT DOCUMENTS

| | | | |
|---|---|---|---|
| 2012/0194012 A1* | 8/2012 | Chamberlin | H02K 1/30 310/54 |
| 2012/0220379 A1* | 8/2012 | Murakami | H02K 1/32 464/7 |
| 2012/0299404 A1* | 11/2012 | Yamamoto | H02K 1/2766 310/61 |
| 2012/0305226 A1* | 12/2012 | Chamberlin | H02K 5/20 165/121 |
| 2013/0257196 A1* | 10/2013 | Yamamoto | H02K 9/19 310/54 |
| 2013/0313928 A1* | 11/2013 | McKinzie | H02K 1/32 310/54 |
| 2013/0334912 A1* | 12/2013 | Tokunaga | H02K 9/19 310/54 |
| 2013/0342045 A1* | 12/2013 | Matsuki | H02K 5/20 310/54 |
| 2014/0077631 A1* | 3/2014 | Watanabe | H02K 9/19 310/54 |
| 2014/0132058 A1* | 5/2014 | Kim | B60K 7/0007 301/6.5 |
| 2015/0015099 A1* | 1/2015 | Matsuki | H02K 1/32 310/61 |
| 2015/0061426 A1* | 3/2015 | Nagumo | H02K 3/522 310/58 |

FOREIGN PATENT DOCUMENTS

| | | |
|---|---|---|
| JP | 2010-220340 A | 9/2010 |
| JP | 2012-29492 | 2/2012 |
| JP | 2013-38840 | 2/2013 |
| JP | 2013-126280 | 6/2013 |
| KR | 10-2014-0066880 | 6/2014 |
| KR | 10-2015-0011970 A | 2/2015 |

* cited by examiner

MOTOR HAVING COOLING STRUCTURE

CROSS-REFERENCE TO RELATED APPLICATION

This application claims priority to and the benefit of Korean Patent Application No. 10-2015-0070644 filed in the Korean Intellectual Property Office on May 20, 2015, wherein the entire contents of which are incorporated herein by reference.

BACKGROUND OF THE DISCLOSURE (a) Technical Field

The present disclosure relates generally to a motor and, more particularly, to a motor having a cooling structure that may be used as a torque source for a hybrid vehicle or an electric vehicle by generating comparative torque of a rotor and a stator with power supplied from a battery.

(b) Description of the Related Art

Generally, a motor includes a stator and a rotor, and the stator is cooled by an air-cooling method or a water-cooling method, thereby controlling a temperature of the motor. However, it is difficult to directly cool the rotor, and thus, the rotor is vulnerable to high heat. Additionally, in the case of a closed-type motor, it is almost impossible to conduct the cooling process through outdoor air.

In addition, since the rotor has a structure that is not able to be easily cooled, a designer must carefully consider limited factors with respect to voltage, current, and output thereof. Furthermore, the motor may be mechanically damaged by heat or a temperature gap between the rotor and the stator, and the high heat may result in damage to a bearing thereof.

The above information disclosed in this Background section is only for enhancement of understanding of the background of the disclosure, and therefore, it may contain information that does not form the related art that is already known in this country to a person of ordinary skill in the art.

SUMMARY OF THE DISCLOSURE

The present disclosure has been made in an effort to provide a motor having a cooling structure which may effectively increase the durability of the motor and may further enhance operational stability of the motor by preventing overheating of a rotor, a motor shaft, and a bearing.

Embodiments of the present disclosure provide a motor having a cooling structure, including: a motor shaft in which a cooling passage is formed in a center thereof in a lengthwise direction; a rotor disposed at an exterior circumference of the motor shaft to rotate together with the motor shaft; and a motor housing in which a stator fixed at a predetermined interval from the rotor is disposed at an interior circumference thereof and in which the motor shaft is disposed to be rotatable. A coolant flowing through the cooling passage may be jetted to the rotor or the stator.

A branching pipe may be disposed on an interior circumference of the motor housing from a side of the exterior circumference of the motor shaft, a branching passage connected to the cooling passage may be formed on a center of the branching pipe, and the coolant which flows through the cooling passage also flows through the branching passage and may be jetted to the rotor or the stator.

The motor having the cooling structure may further include a jet pipe that is connected to the branching pipe. A jet hole may be formed at a center of an end portion of the jet pipe, and the jet hole may be connected to the branching passage to jet the coolant therethrough.

The motor having the cooling structure may further include a magnet fixed to a side of the rotor. The coolant flowing through the cooling passage may be jetted to the magnet to cool the magnet.

The magnet may be inserted into the rotor in a lengthwise direction of the motor shaft.

The jet hole may be arranged at a predetermined rotation interval based on the motor shaft.

The jet pipe may be disposed to be parallel to a central axis of the lengthwise direction of the motor shaft.

The jet pipe may be disposed at a predetermined slope with respect to the central axis of the lengthwise direction of the motor shaft.

The coolant may contain cooling oil.

Furthermore, according to embodiments of the present disclosure, a motor having a cooling structure includes: a motor shaft in which a cooling passage is formed in a center thereof in a lengthwise direction; a rotor disposed at an exterior circumference of the motor shaft to rotate together with the motor shaft; a motor housing in which a stator fixed at a predetermined interval from the rotor is disposed at an interior circumference thereof and in which the motor shaft is disposed to be rotatable; a branching pipe that is fixed on the exterior circumference of the motor shaft and in which a branching passage connected to the cooling passage is formed; and a jet pipe that is connected to the branching pipe and in which a jet hole connected to the branching passage is formed. A coolant may pass through the cooling passage, the branching passage, and the jet hole, and then may be jetted to the rotor or the stator.

The motor having the cooling structure may further include a magnet fixed to a side of the rotor. The coolant may be jetted to the magnet to cool the magnet.

The motor having the cooling structure may further include a bearing supporting the motor shaft to be rotatable in the motor housing. The cooling passage may be formed to pass through a portion corresponding to the bearing in the motor shaft.

The branching pipe may be disposed in a space between a side of the rotor and an interior side of the motor housing.

According to the embodiments of the present disclosure, it is possible to effectively and rapidly cool a rotor or a stator of a motor by supplying coolant through a cooling passage formed in a center of a motor shaft and jetting the coolant into a space in which the rotor or the stator is disposed. Further, according to the embodiments of the present disclosure, the coolant moving through the motor shaft is jetted to a magnet of the rotor through a branching pipe and a jetting pipe, thereby effectively and rapidly cooling a high temperature portion of the motor.

DETAILED DESCRIPTION OF THE EMBODIMENTS

Figure 1:
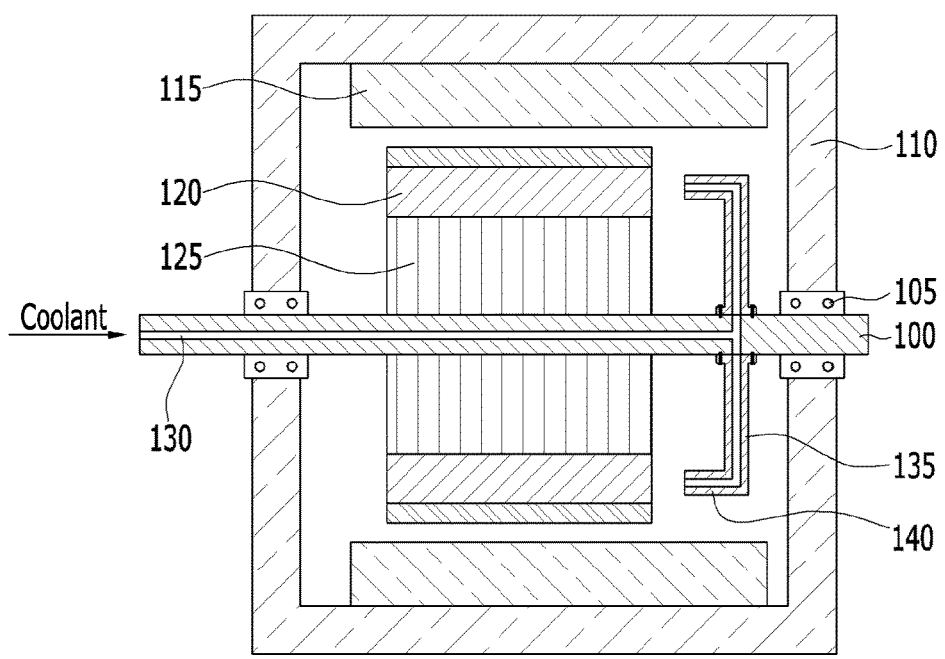
FIG. 1 illustrates a cross-sectional view of a motor having a cooling structure according to embodiments of the present disclosure.

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Embodiments of the present disclosure will hereinafter be described in detail with reference to the accompanying drawings.

FIG. 1 illustrates a cross-sectional view of a motor having a cooling structure according to embodiments of the present disclosure.

As shown in FIG. 1, the motor includes: a motor housing 110, a bearing 105, a motor shaft 100, a branching pipe 135, a jet pipe 140, a cooling passage 130, a rotor 125, a magnet 120, and a stator 115.

The cooling passage 130 is formed on the central axis of a lengthwise direction of the motor shaft 100, the branching pipe 135 extended to the outer side is disposed on one side of a exterior circumference of the motor shaft 100, the jet pipe 140 is disposed at an end portion of the branching pipe 135, and parts such as the motor shaft 100, the branching pipe 135, and the jet pipe 140 may be separately provided and engaged.

The rotor is fixedly disposed on the exterior circumference of the motor shaft 100 to be adjacent to the branching pipe 135, and the magnet 120 is fixedly inserted into the rotor 125 in the lengthwise direction of the motor shaft 100.

The stator 115 is fixed on the interior circumference of the motor housing 110, and the interior circumference of the stator 115 and the exterior circumference of the rotor 125 are disposed with a predetermined interval therebetween.

The rotor 125 and the motor shaft 100 are disposed to rotate based on the stator 115.

The motor shaft 100 is disposed to penetrate one side and the other side of the motor housing 110, and the bearing is respectively interposed between the exterior circumference of the motor shaft 100 and the motor housing 110, such that the motor shaft 100 is disposed to be rotatable in the motor housing 110.

A coolant supplied through the cooling passage 130 of the motor shaft 100 passes through the branching pipe 135 and the jet pipe 140, and then is jetted to the magnet 120 of the rotor 125, thereby cooling the rotor 125, the magnet 120, and the stator 115, and further cooling the bearing 105 while passing through the cooling passage 130 of the motor shaft 100.

According to embodiments of the present disclosure, the coolant passing through the cooling passage 130 may be directly jetted to a space in which the rotor 125 and the stator 115 are disposed without the branching pipe 135 and the jet pipe 140.

Additionally, the coolant passing through the cooling passage 130 may be directly jetted to the space in which the rotor 125 and the stator 115 are disposed from the branching pipe 135 without the jet pipe 140.

Further, the magnet 120 may not be disposed, and the rotor 125 may have a structure wound with a coil. In this case, the coolant may be jetted to one side of the rotor 125, and the coolant may include cooling oil.

Figure 2:
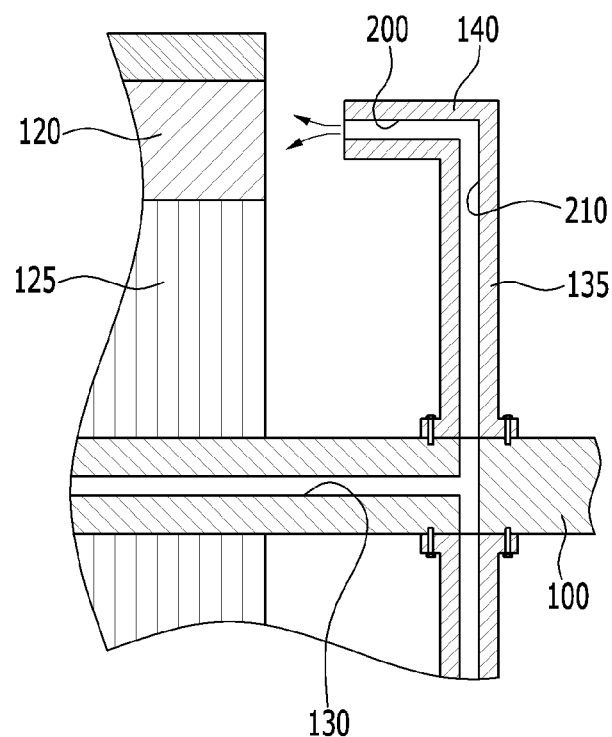
FIG. 2 illustrates a partial cross-sectional view of the motor having the cooling structure according to embodiments of the present disclosure.

FIG. 2 illustrates a partial cross-sectional view of the motor having the cooling structure according to embodiments of the present disclosure.

As shown in FIG. 2, the branching pipe 135 is disposed on the motor shaft 100, the branching pipe 135 is extended at a predetermined angle with respect to the motor shaft 100, and a branching passage 210 connected to the cooling passage 130 is formed inside the branching pipe 135.

The jet pipe 140 is integrally formed at an end portion of the outer side of the branching pipe 135, the jet pipe 140 is extended in one side direction of the rotor 125 to be parallel to the motor shaft 100, and a jet hole 200 jetting the coolant is formed on a center of the end portion.

The coolant jetted from the jet hole 200 reaches the magnet 120 fixed to the rotor 125 to mainly cool the rotor 125 and the magnet 120, thereby rapidly controlling an internal temperature of the stator 115 and the motor housing 110.

Figure 3:
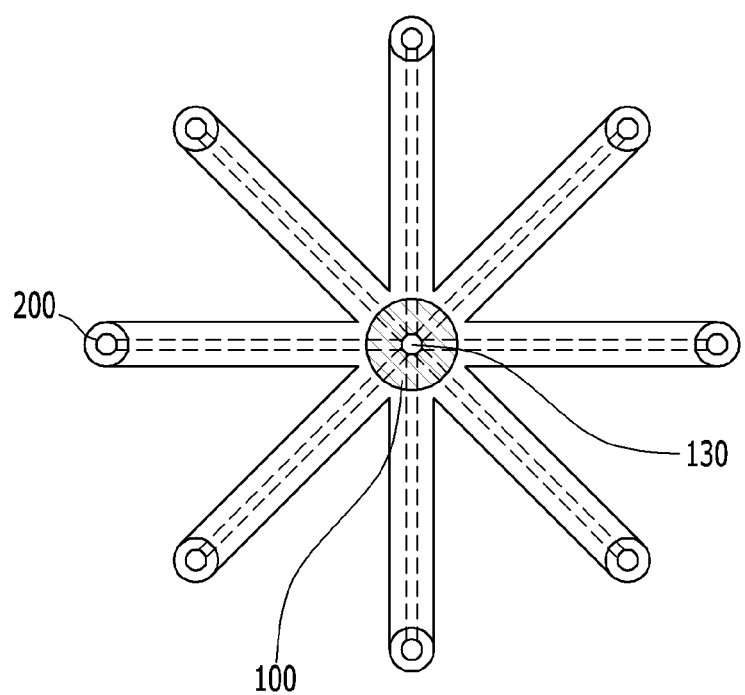
FIG. 3 illustrates a partial cross-sectional side view of the disposition of a jet hole provided in the motor having the cooling structure according to embodiments of the present disclosure.

FIG. 3 illustrates a partial cross-sectional side view of the disposition of a jet hole provided in the motor having the cooling structure according to embodiments of the present disclosure.

As shown in FIG. 3, the motor shaft 100 is disposed on a center of the motor, the cooling passage 130 is disposed on a rotation center of the motor shaft 100, and the jet hole 200 is arranged with a predetermined interval in a rotating direction of the motor shaft 100 set based on the motor shaft 100.

Figure 4:
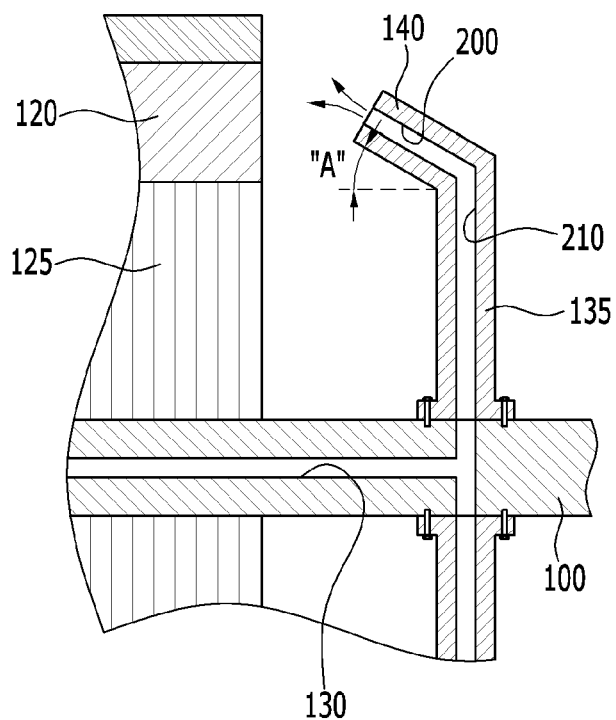
FIG. 4 illustrates a partial cross-sectional view of the motor having the cooling structure according to embodiments of the present disclosure.

FIG. 4 illustrates a partial cross-sectional view of the motor having the cooling structure according to embodiments of the present disclosure.

As shown in FIG. 4, one side of the exterior circumference of the motor shaft 100 is engaged with the branching pipe 135, the branching pipe 135 forms a predetermined angle with respect to the motor shaft 100, and the branching passage 210 connected to the cooling passage 130 is formed inside the branching pipe 135.

The jet pipe 140 is integrally formed at the end portion of the outer side of the branching pipe 135, the jet pipe 140 is extended to the rotor 125 while forming a predetermined angle A with respect to the motor shaft 100, and the jet hole 200 jetting the coolant is formed on the center of the end portion.

The coolant jetted from the jet hole 200 arrives at the rotor 125 or the magnet 120, then mainly cools the rotor 125 and the magnet 120, and may also cool the stator 115 disposed on the outer side of the rotor 125.

In the above-explained embodiments of the present disclosure, the branching pipe 135 is extended in a direction away from the center of the motor shaft 100. In this case, when the motor shaft 100 rotates at a high speed, the coolant passing through the branching passage 210 of the branching pipe 135 is pumped by centrifugal force, thereby effectively increasing a jet pressure jetted from the jet hole 200 and decreasing consumption of energy for supplying the coolant.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

| <Description of symbols> | |
|---|---|
| 100: motor shaft | 105: bearing |
| 110: motor housing | 115: stator |
| 120: magnet | 125: rotor |
| 130: cooling passage | 135: branching pipe |
| 140: jet pipe | 200: jet hole |
| 210: branching passage | |

What is claimed is:

1. A motor having a cooling structure, comprising:
   a motor shaft in which a cooling passage is formed in a center thereof in a lengthwise direction;
   a rotor disposed at an exterior circumference of the motor shaft to rotate together with the motor shaft; and
   a motor housing in which a stator fixed at a predetermined interval from the rotor is disposed at an interior circumference thereof and in which the motor shaft is disposed to be rotatable,
   wherein a coolant flowing through the cooling passage is jetted to the rotor or the stator,
   wherein a branching pipe protrudes toward an interior circumference of the motor housing from the exterior circumference of the motor shaft, the branching pipe being axially apart from the rotor, and
   wherein a branching passage connected to the cooling passage is formed along a center of the branching pipe.

2. The motor having the cooling structure of claim 1, wherein:
   the coolant which flows through the cooling passage also flows through the branching passage and is jetted to the rotor or the stator.

3. The motor having the cooling structure of claim 2, further comprising a jet pipe that is connected to the branching pipe,
   wherein a jet hole is formed at a center of an end portion of the jet pipe, and
   the jet hole is connected to the branching passage to jet the coolant therethrough.

4. The motor having the cooling structure of claim 3, wherein the jet hole is arranged at a predetermined rotation interval based on the motor shaft.

5. The motor having the cooling structure of claim 3, wherein the jet pipe is disposed to be parallel to a central axis of the lengthwise direction of the motor shaft.

6. The motor having the cooling structure of claim 5, wherein the jet pipe is disposed at a predetermined slope with respect to the central axis of the lengthwise direction of the motor shaft.

7. The motor having the cooling structure of claim 1, further comprising a magnet fixed to a side of the rotor,
   wherein the coolant flowing through the cooling passage is jetted to the magnet to cool the magnet.

8. The motor having the cooling structure of claim 7, wherein the magnet is inserted into the rotor in a lengthwise direction of the motor shaft.

9. The motor having the cooling structure of claim 1, wherein the coolant contains cooling oil.

10. A motor having a cooling structure, comprising:
    a motor shaft in which a cooling passage is formed in a center thereof in a lengthwise direction;
    a rotor disposed at an exterior circumference of the motor shaft to rotate together with the motor shaft;
    a motor housing in which a stator fixed at a predetermined interval from the rotor is disposed at an interior circumference thereof and in which the motor shaft is disposed to be rotatable;
    a branching pipe that is fixed on the exterior circumference of the motor shaft at a location axially apart from the rotor and forms a branching passage along a center of the branching pipe, the branching passage being connected to the cooling passage; and
    a jet pipe that is connected to the branching pipe and in which a jet hole connected to the branching passage is formed,
    wherein a coolant passes through the cooling passage, the branching passage, and the jet hole, and then is jetted to the rotor or the stator.

11. The motor having the cooling structure of claim 10, further comprising a magnet fixed to a side of the rotor,
    wherein the coolant is jetted to the magnet to cool the magnet.

12. The motor having the cooling structure of claim 10, further comprising a bearing supporting the motor shaft to be rotatable in the motor housing,
    wherein the cooling passage is formed to pass through a portion corresponding to the bearing in the motor shaft.

13. The motor having the cooling structure of claim 10, wherein the branching pipe is disposed in a space between a side of the rotor and an interior side of the motor housing.

* * * * *